US012596832B2

(12) United States Patent
Gordon et al.

(10) Patent No.: US 12,596,832 B2
(45) Date of Patent: Apr. 7, 2026

(54) AUTOMATED DETECTION AND PREVENTION OF DISCLOSURE OF SENSITIVE INFORMATION VIA ELECTRONIC MESSAGING

(71) Applicant: International Business Machines Corporation, Armonk, NY (US)

(72) Inventors: Itai Gordon, Modiin (IL); Miriam Nizri, Jerusalem (IL); Shlomit Avrahami Tomer, Jerusalem (IL); Ofer Haim, Rosh Ha+3 ain (IL)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 18/097,300

(22) Filed: Jan. 16, 2023

(65) Prior Publication Data

US 2024/0241982 A1    Jul. 18, 2024

(51) Int. Cl.
*G06F 21/62* (2013.01)
*G06F 21/60* (2013.01)
*G06F 40/40* (2020.01)

(52) U.S. Cl.
CPC ........ *G06F 21/6227* (2013.01); *G06F 21/604* (2013.01); *G06F 40/40* (2020.01); *G06F 2221/2141* (2013.01)

(58) Field of Classification Search
CPC .... G06F 21/6227; G06F 40/40; G06F 21/604; G06F 2221/2141
See application file for complete search history.

(56) References Cited

U.S. PATENT DOCUMENTS

| | | | |
|---|---|---|---|
| 7,587,368 B2 * | 9/2009 | Felsher | ............... G06F 21/6245 705/52 |
| 8,826,370 B2 | 9/2014 | Boukobza | |
| 10,033,766 B2 | 7/2018 | Gupta | |

(Continued)

OTHER PUBLICATIONS

Satwik Ram Kodandaram et al, "Masking private user information using Natural Language Processing"; International Journal of Advance Research in Computer Science and Management 7(3):1753-1763, Jun. 2021.

(Continued)

*Primary Examiner* — Amir Mehrmanesh
*Assistant Examiner* — Forrest L Carey
(74) *Attorney, Agent, or Firm* — Edward J. Wixted, III

(57) ABSTRACT

A method including: intercepting an electronic message between a sender and a recipient who both belong to a same organization, before the electronic message is viewed by the recipient; utilizing an NLP algorithm, a sensitive information detection algorithm, and a glossary of the organization, to identify a sensitive element in the electronic message and to map a relevant term in the glossary to a field name in a database of the organization; generating a database query that is configured to retrieve the sensitive element from the database; attempting to execute the database query as the recipient of the electronic message, such that the attempted execution is inspected by activity monitoring software associated with the database; and based on a response from the activity monitoring software, deciding whether to enable the recipient to view the electronic message with or without the sensitive element included in it.

20 Claims, 3 Drawing Sheets

(56) References Cited

U.S. PATENT DOCUMENTS

| | | | |
|---|---|---|---|
| 2010/0205189 A1 | 8/2010 | Ebrahimi | |
| 2012/0271856 A1* | 10/2012 | Carr | G06F 21/6218 |
| | | | 707/E17.005 |
| 2015/0324606 A1 | 11/2015 | Grondin | |
| 2018/0063182 A1 | 3/2018 | Jones | |
| 2019/0213354 A1 | 7/2019 | Bhowan | |
| 2020/0311304 A1 | 10/2020 | Parthasarathy | |
| 2020/0380167 A1* | 12/2020 | Chen | H04L 63/0245 |
| 2021/0089620 A1 | 3/2021 | Finkelshtein | |
| 2021/0240849 A1 | 8/2021 | Barday | |

OTHER PUBLICATIONS

IBM Products, IBM, 2023, 13 pages, 2023, doi: https://www.ibm.com/demos/live/natural-language-understanding/self-service/home.

* cited by examiner

AUTOMATED DETECTION AND PREVENTION OF DISCLOSURE OF SENSITIVE INFORMATION VIA ELECTRONIC MESSAGING

BACKGROUND

The invention relates to the field of information security.

The unauthorized disclosure of sensitive information within an organization can have serious consequences, including financial loss, damage to reputation, and legal liabilities. To prevent such disclosures, many organizations implement policies and procedures for the handling of sensitive information. Organizations also typically implement user-level and role-level permissions in their computerized systems, such as using access control lists (ACLs) or similar mechanisms. These mechanisms allow organizations to specify which users or groups of users have access to certain resources or functions within the system. For example, an organization may grant certain users the ability to read and write information in particular fields of the organization's database, while denying these permissions to other users.

However, these measures are often insufficient to prevent accidental or intentional disclosures through electronic messaging systems, such as when one member of the organization discloses sensitive information in an electronic message to another member who is not authorized to know that information.

As the use of electronic messaging systems, such as email and instant messaging, has become increasingly prevalent within organizations, there is a need for more effective methods of detecting and preventing the unauthorized disclosure of sensitive information through these systems. This is particularly important given the case with which sensitive information can be shared through these systems and the difficulty in recalling or retracting messages once they have been sent.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a computer-implemented method comprising: intercepting an electronic message between a sender and a recipient who both belong to a same organization, before the electronic message is viewed by the recipient; applying a Natural Language Processing (NLP) algorithm to content of the electronic message, to detect elements and relations between the elements; applying a sensitive information detection algorithm to the detected elements, to classify at least one of the elements as a sensitive element; based on the detected relation between the sensitive element and another one of the elements, searching a glossary of the organization to find a term associated with the other element; mapping the found term to a name of a field in a database of the organization; generating a database query that is configured to retrieve the sensitive element from the field in the database; attempting to execute the database query as the recipient of the electronic message, such that the attempted execution is inspected by activity monitoring software associated with the database, the activity monitoring software being configured to detect unauthorized access to data in the database; receiving a response to the attempted execution from the activity monitoring software or from the database; when the response indicates that the recipient of the electronic message is authorized to access the sensitive element in the database, enabling the recipient to view the electronic message without any modification to the content of the electronic message; and when the response indicates that the recipient of the electronic message is unauthorized to access the sensitive element in the database, performing at least one of the following actions: (a) modifying the electronic message by removing the sensitive element from the content of the electronic message, and enabling the recipient to view the modified electronic message, (b) preventing the recipient from viewing the electronic message, and (c) alerting at least one of: the sender of the electronic message, the recipient of the electronic message, and an information security officer of the organization.

In some embodiments, the method is executed by a system that comprises at least one hardware processor and a non-transitory computer-readable storage medium having program code embodied therewith, the program code executable by said at least one hardware processor to execute the steps of the method.

In some embodiments, the method is executed by a computer program product that comprises a non-transitory computer-readable storage medium having program code embodied therewith, the program code executable by at least one hardware processor to execute the steps of the method.

In some embodiments, the electronic message is selected from the group consisting of: an email message, and an instant message.

In some embodiments, the interception of the electronic message is performed by a messaging server.

In some embodiments, the interception of the electronic message is performed by a messaging client of the sender or a messaging client of the recipient.

In some embodiments, the glossary comprises definitions to terms used internally by the organization.

In some embodiments, the attempting to execute the database query as the recipient of the electronic message comprises: obtaining a database username of the recipient from a user directory of the organization; and attempting the execution by that database username.

In some embodiments, the activity monitoring software is configured to detect the unauthorized access by monitoring traffic to and from the database, and applying one or more security policies to the monitored traffic.

In some embodiments, the removing of the sensitive element from the content of the electronic message comprises: deleting the sensitive element; or masking the sensitive element.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a method, also embodied in a system and a computer program product, for automatically detecting and/or preventing disclosure of sensitive information via electronic messaging to unauthorized persons within an organization. For example, the method may detect that a member of the organization has sent sensitive information via an electronic message to another member of the organization who is not authorized to know that information; the method may subsequently prevent that information from reaching the unauthorized member by removing it from the electronic message before the message is delivered to or is viewed by the unauthorized member. It is also possible, in addition to or instead of such removal, to alert the sender, recipient, and/or information security officer of the organization, about the unauthorized information disclosure.

Advantageously, the method may infer whether a recipient of an electronic message is authorized to know certain sensitive information by way of an unconventional leveraging of certain activity monitoring software associated with one or more internal databases of the organization. Such activity monitoring software, which is employed today by many organizations, is typically configured to detect and/or prevent unauthorized access to data stored in the organization's database(s).

The present method intelligently leverages and repurposes such activity monitoring software to also detect instances of unauthorized disclosure of sensitive information in electronic messages exchanged between members of the organization: upon detecting potentially sensitive information in an electronic message using suitable software algorithms, the method may generate a database query that is configured to retrieve that sensitive information from the database. An attempt to execute that query in the organization's database(s) may then be made on behalf of the recipient of the electronic message, namely—by transmitting that query to the database(s) as if it were instructed by the recipient. The activity monitoring software, due to its constant monitoring of the activity in the database(s), will then be independently triggered to inspect the query and evaluate whether it constitutes an attempt by the recipient to gain unauthorized access to that certain sensitive information in the database(s). If the activity monitoring software deduces that the recipient is authorized to access the sensitive information in the database(s), it means that the recipient is similarly authorized to be exposed to the sensitive information contained in the electronic message addressed to him or her, and vice versa.

Figure 1:
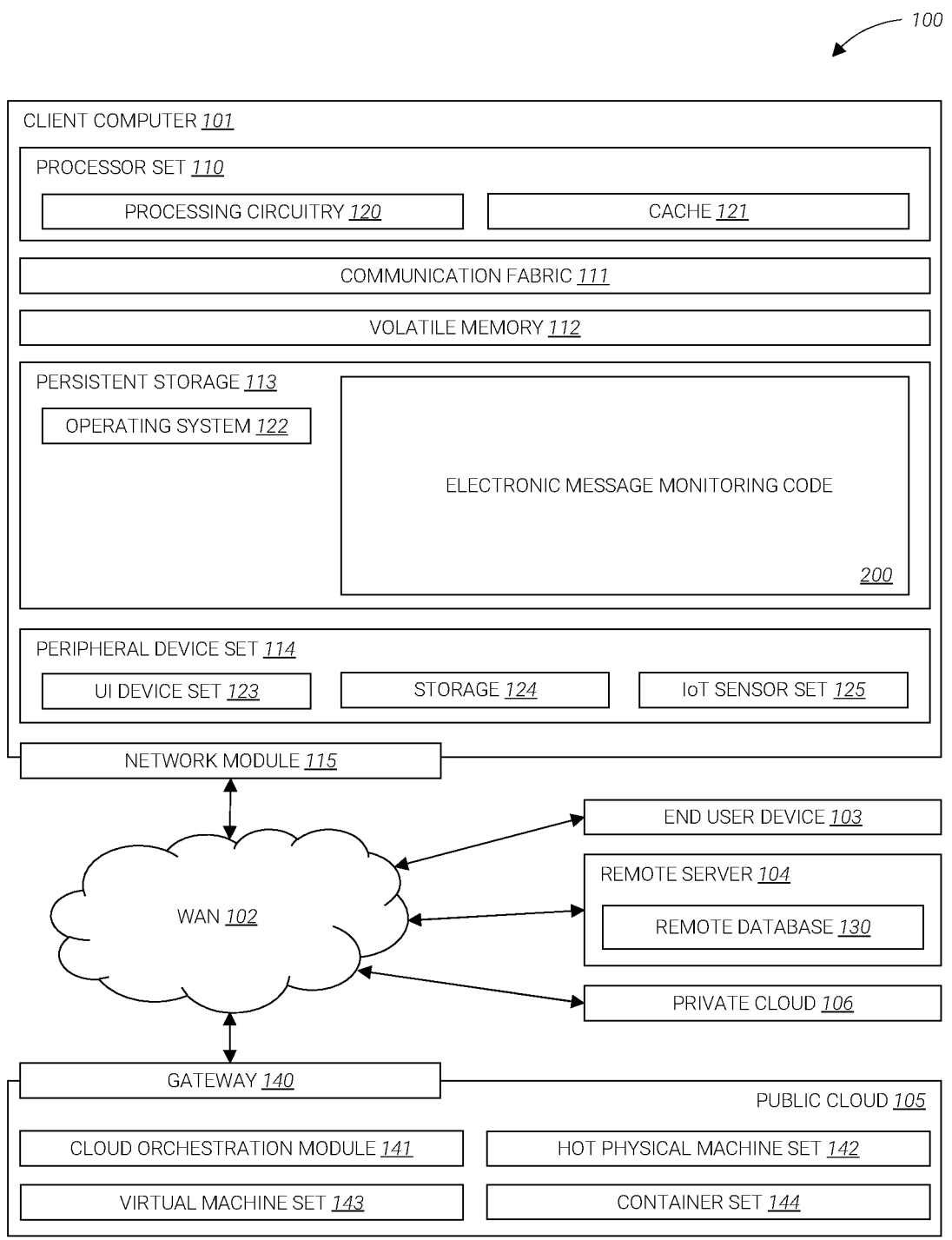
FIG. 1 is a block diagram of an exemplary computing environment for the execution of at least some of the computer code involved in performing the inventive methods.

Reference is now made to FIG. 1, which shows a block diagram of an exemplary computing environment 100, containing an example of an environment for the execution of at least some of the computer code involved in performing the inventive methods, such as electronic message monitoring code 200. In addition to block 200, computing environment 100 includes, for example, a computer 101, a wide area network (WAN) 102, an end user device (EUD) 103, a remote server 104, a public cloud 105, and/or a private cloud 106. In this example, computer 101 includes a processor set 110 (including processing circuitry 120 and a cache 121), a communication fabric 111, a volatile memory 112, a persistent storage 113 (including an operating system 122 and block 200, as identified above), a peripheral device set 114 (including a user interface (UI), a device set 123, a storage 124, and an Internet of Things (IoT) sensor set 125), and a network module 115. Remote server 104 includes a remote database 130. Public cloud 105 includes a gateway 140, a cloud orchestration module 141, a host physical machine set 142, a virtual machine set 143, and a container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network and/or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the method(s) specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as a network interface controller (NIC), a modem, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through the hardware included in network module 115.

WAN 102 is any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The instructions of block 200 are now discussed with reference to the flowchart of FIG. 2, which illustrates a method 202 for automatically detecting and/or preventing disclosure of sensitive information via electronic messaging to unauthorized persons within an organization, in accordance with an embodiment.

Steps of method 202 may either be performed in the order they are presented or in a different order (or even in parallel), as briefly mentioned above, as long as the order allows for a necessary input to a certain step to be obtained from an output of an earlier step. In addition, the steps of method 202 are performed automatically (e.g., by computer 101 of FIG. 1, and/or by any other applicable component of computing environment 100), unless specifically stated otherwise.

In a step 204, an electronic message between a sender and a recipient may be intercepted before its content is viewed by the recipient. Both the sender and the recipient may belong to the same organization, such as business organization (e.g., a corporation), a government organization, etc. In this sense, the electronic message may be regarded as an 'internal' electronic message within the organization.

The electronic message may be, for example, an email message, an instant message sent via a chat interface, etc. The electronic message may be addressed to one or multiple recipients, or even to a named group whose members will be the eventual recipients of the message. For simplicity of discussion, the following description addresses the case of a single recipient, but those of skill in the art will recognize how steps of method 202 may be repeated for each recipient in order to address the case of multiple recipients.

The interception of the electronic message may take one of several forms:

In one example, the interception may be performed at the server level, namely, by a messaging server (e.g., a mail server in case of an email or an instant messaging server in case of an instant message) which, after having received the electronic message from the sender, does not relay (deliver) it to the recipient until the pertinent steps of method 202, discussed below, are completed (and, in certain cases, the messaging server will avoid relaying the electronic message to the recipient permanently). If the interception is performed at the server level, then all subsequent steps of method 202 may also be performed at the server level, for example by the mail server or instant messaging server, or by a separate server in communication with any of the foregoing servers.

In another example, the interception may be implemented at the client level, for example at the electronic messaging client of the sender and/or the recipient. For instance, the sender and the recipient may each utilize an email client (e.g., HCL Notes, Microsoft Outlook, Apple Mail, Mozilla Thunderbird, etc.) or an instant messaging client (e.g., Slack, Microsoft Teams, Google Chat, etc.) installed on their computing devices to send and receive electronic messages. The code of any such electronic messaging client may be altered to include program instructions that perform the interception, or, alternatively, an add-on including such program instructions may be separately installed on the pertinent computing device and cooperate with the electronic messaging client to perform the interception. The program instructions, when operating within the electronic messaging client of the sender or as an add-on to that client, may intercept the electronic message by preventing its transmission to a messaging server even after the sender has instructed such sending (e.g., by clicking a 'send' button or taking a similar action in the user interface of the electronic messaging client); the program instructions will not transmit the electronic message to the messaging server until the pertinent steps of method 202, discussed below, are completed (and, in certain cases, the program instructions will avoid transmitting the electronic message to the re messaging server permanently). In the opposite case, where the program instructions operate within the electronic messaging client of the recipient or as an add-on to that client, the electronic message may be intercepted after it has been received at the electronic messaging client, by preventing the recipient from viewing it (or at least its contents) until such time as explained above. If the interception is performed at the client level, then all subsequent steps of method 202 may also be performed at the client level, for example by the email client, instant messaging client, or add-on to any of the former. Alternatively, the email client, instant messaging client, or add-on may communicate with a server which is configured to perform the subsequent steps of method 202, except for the final few steps (discussed in greater detail below) that are taken after receiving a response from a database or an activity monitoring software associated with the database; these final few steps may be performed by the email client, instant messaging client, or add-on.

Figure 3:
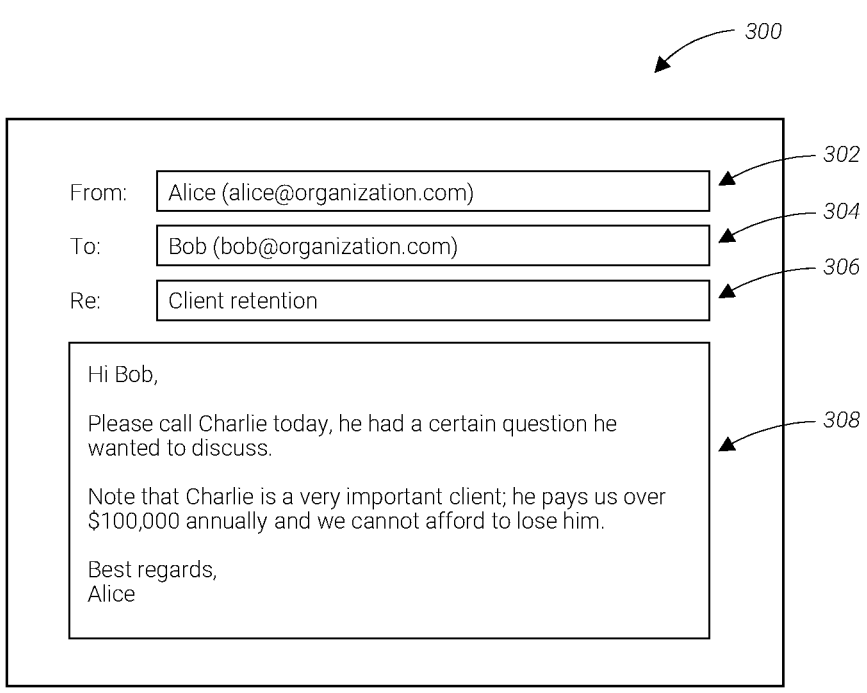
FIG. 3 shows an exemplary electronic message displayed within a graphical user interface.

Interim reference is made to FIG. 3, which shows an exemplary electronic message 300, in this example an email message, displayed within a graphical user interface (GUI). The sender 302 of message 300 is Alice, and its recipient 304 is Bob. The subject 306 and/or body 308 of message 300 may be regarded as its "content." Had message 300 included an attachment, such as an electronic file, the contents of that file were also to be considered as part of the "content" of the message, because they may just as well contain sensitive information which Bob is not authorized to know.

Parenthetically, if message 300 were not an email message but rather an instant message, it may have included a single content field instead of the separate subject 306 and body 308 fields.

The term "content," as referred to herein with respect to message 300 and to an electronic message in general, is intended to relate to a part of the message written in free text (typically by the sender, but potentially adopted by the sender from another source), namely, in natural language including words and sentences. Said that, the content may also include structured text, such as text organized in tabular format.

From an information security perspective, the organization to which Alice and Bob belong may wish to ensure that Alice does not expose Bob to information which, under the organization's relevant policy, Bob is not authorized to know. In other words, is there anything in the content of message 300 which Bob should not be exposed to?

In the following discussion, steps of method 202 are occasionally demonstrated using the example of FIG. 3.

Figure 2:
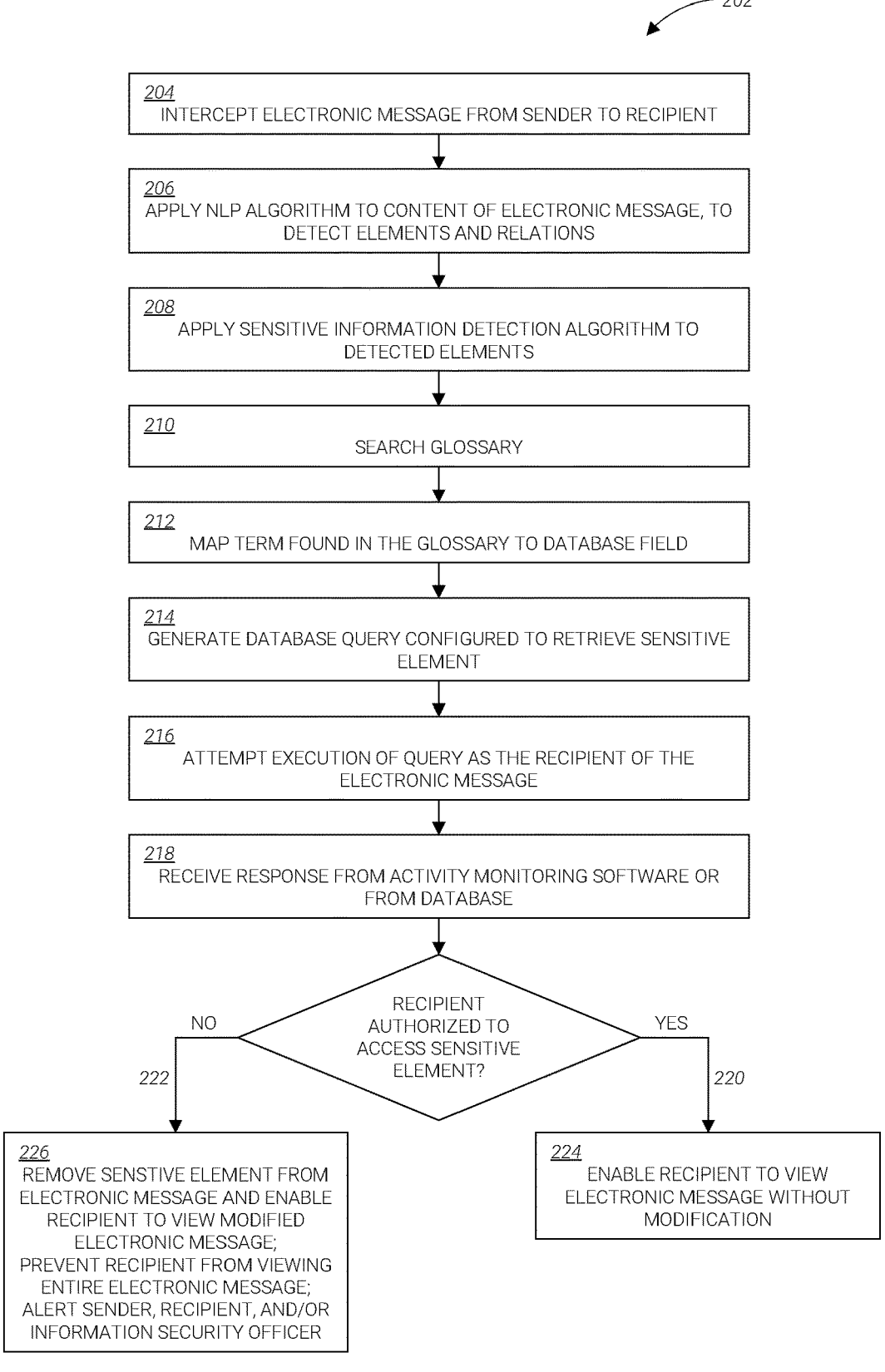
FIG. 2 is a flowchart of a method for automatically detecting and/or preventing disclosure of sensitive information via electronic messaging to unauthorized persons within an organization.

Reference is now made back to FIG. 2. In a step 206, to prepare the contents of the electronic message to detection of sensitive information which may be included therein, a Natural Language Processing (NLP) algorithm may be applied to the content so as to detect elements and relations between the elements. The elements may be, for example, entities existing in the content. In one exemplary embodiment, the term "entity" means a "token" consisting of one or more characters or words, as customary in the field of Named Entity Recognition (NER).

The NLP algorithm is optionally a Natural Language Understanding (NLU) algorithm, a NER algorithm, and/or any other type of NLP machine learning model which is trained and configured to detect elements of certain types and relations between such elements, in a text. An example of such algorithm is the IBM Watson Natural Language Understanding tool, available from International Business Machines Corporation of Armonk, New York, USA.

For example, the NLP algorithm may detect that, in the content of message 300 of FIG. 3, "$100,000" is an entity of the type "money," which is related to the entities "pay," "client," and "Charlie."

In a step 208, a sensitive information detection algorithm may be applied to the detected elements, to classify at least one of the elements as a sensitive element. The sensitive information detection algorithm may be a machine learning model which is trained and configured to detect, in a text, words and/or terms which might constitute sensitive information, namely, information whose owner or handler is likely to prefer to keep confidential from certain third parties. An example of such algorithm is the IBM InfoSphere Optim Data Privacy tool, available from International Business Machines Corporation of Armonk, New York, USA.

For example, the sensitive information detection algorithm may classify the element "$100,000" as sensitive, possibly because monetary amounts are desired to be kept confidential in many scenarios.

In a step 210, based on the detected relation between the sensitive element (e.g., "$100,000") and another one of the elements (e.g., "pay," "client," "Charlie"), a glossary of the organization may be searched to find a term associated with the other element ("pay," "client," "Charlie"). Many organizations today employ such glossaries, sometimes termed "business glossaries," to help members of the organization match everyday language to jargon and specific terminology used internally by the organization. For example, if the organization charges its client exclusively on a subscription fee basis, the glossary may include a definition for "subscription fee," describing it is the form of payment the organization receives from its clients. Similarly, the glossary may include full names of clients and names of contact persons at each client, and more.

Step 210, essentially, may be aimed at using the detected elements which are related to the sensitive element as search queries for the glossary. Searching the glossary just for the sensitive element is likely to be futile, as in the case of "$100,000": The glossary is unlikely to include a definition for any monetary amounts.

Let us assume that one glossary search of step 210 used the term "pay" as a query, returning a result of "subscription fee"; another glossary search used the term "Charlie" as a query, returning a result of "IBM" (a client organization in which Charlie is employed); and another glossary search used the term "client" as a query, returning a result of "client" (because the organization refers to clients as such). Then, in a step 212, one or more of the found terms ("subscription fee," "IBM," "client") may each be mapped to a field in a database of the organization, such as a database storing confidential information of the organization (employee data, client data, etc.). The mapping may utilize conventional techniques for fuzzy matching of terms, such that, for example, the term "subscription fee" is mapped to a database column named "subscr_fee." located in a database table named "client_payments," and the term "client" is mapped to a database column named "client_name" in that same database table.

In a step 214, a database query may be generated, that is configured to retrieve the sensitive element ("$100,000") from the field ("subscr_fee") in the database. For example, if the database is configured to be queried using Structured Query Language (SQL), the following exemplary query may be generated:

SELECT subscr_fee FROM client_payments WHERE client_name="IBM"

This query, once executed in the database, will return the subscription fee paid to the organization by IBM, which is likely the $100,000 mentioned by Alice in her email, or a different amount (in case Alice was mistaken) which of course is just as sensitive, and which Bob may not be authorized to know.

In a step 216, execution of the generated query in the database may be attempted. The execution may be attempted as (on behalf of) the recipient of the electronic message. Namely, the query may be submitted to the database by a username (registered in the database) of the recipient of the electronic message. This way, retrieval of the sensitive element from the database will be attempted, from the database's point of view, by the recipient of the electronic message. To facilitate step 216, a database username of the recipient may be obtained from a user directory of the organization, where the usernames of organization members in various organizational systems (e.g., email, instant messaging, databases) are centrally stored. This may be, for example, a user directory operating according to the Lightweight Directory Access Protocol (LDAP).

The database may be functionally associated with a certain activity monitoring software which is configured to detect and/or prevent unauthorized access to data stored in the database. An example of such activity monitoring software is the IBM Guardium Data Activity Monitoring tool, available from International Business Machines Corporation of Armonk, New York, USA. The activity monitoring software may operate by monitoring traffic to and from the database, and applying one or more security policies to the observed traffic. Each security policy may include rules, such as manually-programmed rules, rules generated by a machine learning model based on examples of authorized and unauthorized traffic, or a combination of both.

Since traffic to and from the database is monitored by the activity monitoring software, the attempted execution of the generated query will also be inspected by the activity monitoring software.

In a step 218, a response to the attempted execution of the query may be received from the activity monitoring software or from the database itself. The response may either be indicative that the recipient of the electronic message is authorized 220 to access the sensitive element in the database, or that the recipient is unauthorized 222 to do so.

A response indicating that the recipient of the electronic message is authorized 220 may be manifested, for example, by a response from the activity monitoring software or from the database itself which provides the requested sensitive element—the subscription fee paid by IBM in the above example. In a step 224, when such response is received, an action may be taken to enable the recipient to view the electronic message without any modification to the content of the electronic message. Depending on whether the interception of the electronic message was performed by the messaging server, the sender's messaging client, or the recipient's messaging client, one of the following actions may be taken, respectively: relaying the electronic message to the recipient, transmitting the electronic message from the messaging client of the sender to the messaging server (such that the messaging server relays the electronic message to the recipient), or causing the recipient's messaging client to present the entire electronic message to the recipient.

On the other hand, a response indicating that the recipient of the electronic message is unauthorized 222 may manifest in various different ways. For example, the response may explicitly convey, by a suitable notification, that execution of the query was prevented because the querying user (the recipient of the electronic message) is unauthorized to retrieve the pertinent data from the database. As another example, the response may include a masked version of the data retrieved from the database by the query. Such masking may be similarly indicative of the fact that the querying user is unauthorized to retrieve the pertinent data from the database. For example, the activity monitoring software may mask the retrieved sensitive element ("$100,000") by replacing its digits with an asterisk (e.g., "$*"), or by employing any other conventional masking technique that replaces the retrieved sensitive element, or a part thereof, with one or more non-sensitive characters.

In a step 226, when receiving a response indicating that the recipient of the electronic message is unauthorized 222, one or more of the following actions may be taken: A first possible action is to modify the electronic message by removing the sensitive element from its content of the electronic message, and then enabling the recipient to view the modified electronic message (by the messaging server, the sender's messaging client, or the recipient's messaging client—similar to the explanation given above with respect to step 224). Removal of the sensitive element means either completely deleting it from the content of the electronic message, or masking it (for instance in accordance with the masking applied by the activity monitoring software). A second possible action is to prevent the recipient from viewing the electronic message altogether, namely, discarding the intercepted electronic message. A third possible action is to alert one or more of the following: the sender of the electronic message, the recipient of the electronic message, and an information security officer of the organization. Any such alert may be provided, for example, as an electronic message delivered to the addressee of the alert, and/or as an 'event' logged in a server or a client accessible to the addressee. The term "information security officer of the organization," as those of skill in the art will recognize, is not limited to a person whose formal role name is "information security officer"; rather, this term may refer to any person or even a department in the organization which was assigned to receive alerts as to unauthorized disclosure of sensitive information in internal electronic messaging within the organization.

Generally, as to method 202, the entire method may be executed in near real-time, namely, within a few seconds (e.g., up to 5 seconds) at the most. This is to ensure that the electronic message is only minimally delayed enroute to the recipient, because a too lengthy delay may interfere with the desire of the sender and the recipient (and their organization, of course) to conduct fast and efficient electronic communication.

In addition, in case different steps of method 202 are performed by different computing devices (e.g., different clients, servers, etc.), each of these computing devices may have some or all of the components of computing environment 100 of FIG. 1, and the various computing devices may communicate with each other over a suitable computing network, such as a Local Area Network (LAN) or a Virtual Private Network (VPN) of the organization.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In the description and claims, each of the terms "substantially." "essentially," and forms thereof, when describing a numerical value, means up to a 20% deviation (namely, ±20%) from that value. Similarly, when such a term describes a numerical range, it means up to a 20% broader range–10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:

intercepting an electronic message between a sender and a recipient, who both belong to an organization, before the electronic message is viewed by the recipient;

detecting elements and relations between the elements by applying natural language processing (NLP) to content of the electronic message;

classifying at least one of the elements as a sensitive element;

responsive to a detected relation between the sensitive element and another one of the elements, searching a glossary of the organization for a term associated with the another one of the elements;

mapping the term to a name of a field in a database of the organization;

generating a database query to retrieve a second instance of the sensitive element from the field in the database, wherein the sensitive element is present in the content of the electronic message;

attempting to execute the database query, with a username assigned to the recipient of the electronic message, such that the attempted execution is inspected by activity monitoring software associated with the database, the activity monitoring software being configured to detect unauthorized access to data in the database;

receiving a response to the attempted execution from the activity monitoring software indicating that the username is unauthorized to access the second instance of the sensitive element in the database; and responsive to the response indicating that the username is unauthorized to access the sensitive element in the database, performing a security action respective to the electronic message.

2. The computer-implemented method of claim 1, wherein the electronic message is selected from the group consisting of: an email message and an instant message.

3. The computer-implemented method of claim 1, wherein the intercepting of the electronic message is performed by a messaging server.

4. The computer-implemented method of claim 1, wherein the intercepting of the electronic message is performed by a selection from the group consisting of: a messaging client of the sender and a messaging client of the recipient.

5. The computer-implemented method of claim 1, wherein the glossary comprises definitions to terms used internally by the organization.

6. The computer-implemented method of claim 1, wherein the attempting to execute the database query, with the username assigned to the recipient of the electronic message comprises:

obtaining the username assigned to the recipient from a user directory of the organization.

7. The computer-implemented method of claim 1, wherein the activity monitoring software is configured to detect the unauthorized access by monitoring traffic to and from the database, and applying one or more security policies to the monitored traffic.

8. The computer-implemented method of claim 1, wherein the security action comprises removing the sensitive element from the content of the electronic message by performing a selection from the group consisting of: deleting the sensitive element and masking the sensitive element.

9. A computer system comprising:

a processor set;

one or more computer-readable storage media; and program instructions stored on the one or more computer-readable storage media to cause the processor set to perform operations comprising:

intercepting an electronic message between a sender and a recipient, who both belong to an organization, before the electronic message is viewed by the recipient;

detecting elements and relations between the elements by applying natural language processing (NLP) to content of the electronic message;

classifying at least one of the elements as a sensitive element;

responsive to a detected relation between the sensitive element and another one of the elements, searching a glossary of the organization for a term associated with the another one of the elements;

mapping the term to a name of a field in a database of the organization;

generating a database query to retrieve a second instance of the sensitive element from the field in the database, wherein the sensitive element is present in the content of the electronic message;

attempting to execute the database query, with a username assigned to the recipient of the electronic message, such that the attempted execution is inspected by activity monitoring software associated with the database, the activity monitoring software being configured to detect unauthorized access to data in the database;

receiving a response to the attempted execution from the activity monitoring software or indicating that the username is unauthorized to access the second instance of the sensitive element in the database; and responsive to the response indicating that the username is unauthorized to access the sensitive element in the database, performing a security action respective to the electronic message.

10. The computer system of claim 9, wherein the electronic message is selected from the group consisting of: an email message and an instant message.

11. The computer system of claim 9, wherein the intercepting of the electronic message is performed by a messaging server.

12. The computer system of claim 9, wherein the intercepting of the electronic message is performed by a selection from the group consisting of: a messaging client of the sender and a messaging client of the recipient.

13. The computer system of claim 9, wherein the glossary comprises definitions to terms used internally by the organization.

14. The computer system of claim 9, wherein the attempting to execute the database query, with the username assigned to the recipient of the electronic message comprises:

obtaining the username assigned to the recipient from a user directory of the organization.

15. The computer system of claim 9, wherein the activity monitoring software is configured to detect the unauthorized access by monitoring traffic to and from the database, and applying one or more security policies to the monitored traffic.

16. The computer system of claim 9, wherein the security action comprises removing the sensitive element from the content of the electronic message by performing a selection from the group consisting of: deleting the sensitive element and masking the sensitive element.

17. A computer program product comprising:

one or more computer-readable storage media; and program instructions stored on code the one or more computer-readable storage media to perform operations comprising:

intercepting an electronic message between a sender and a recipient, who both belong to an organization, before the electronic message is viewed by the recipient;

detecting elements and relations between the elements by applying natural language processing (NLP) to content of the electronic message;

classifying at least one of the elements as a sensitive element;

responsive to a the detected relation between the sensitive element and another one of the elements, searching a glossary of the organization for a term associated with the another one of the elements;

mapping the term to a name of a field in a database of the organization;

generating a database query to retrieve a second instance of the sensitive element from the field in the database, wherein the sensitive element is present in the content of the electronic message;

attempting to execute the database query, with a username assigned to the recipient of the electronic message, such that the attempted execution is inspected by activity monitoring software associated with the database, the activity monitoring software being configured to detect unauthorized access to data in the database;

receiving a response to the attempted execution from the activity monitoring software indicating that the username is unauthorized to access the second instance of the sensitive element in the database; and responsive to the response indicating that the username is unauthorized to access the sensitive element in the database, performing a security action respective to the electronic message.

18. The computer program product of claim 17, wherein: the electronic message is selected from the group consisting of: an email message and an instant message.

19. The computer program product of claim 17, wherein the attempting to execute the database query, with the username assigned to the recipient of the electronic message comprises:

obtaining the username assigned to the recipient from a user directory of the organization.

20. The computer program product of claim 17, wherein the activity monitoring software is configured to detect the unauthorized access by monitoring traffic to and from the database, and applying one or more security policies to the monitored traffic.

* * * * *